US009435083B2

(12) United States Patent
Packer et al.

(10) Patent No.: US 9,435,083 B2
(45) Date of Patent: Sep. 6, 2016

(54) SPECIAL COATINGS AND INFILL FOR ARTIFICIAL TURF

(71) Applicants: Sean Allen Packer, Oak Park, CA (US); Alfred Abraham Brenner, Simi Valley, CA (US); Harold Brad Rinehart, Agoura Hills, CA (US)

(72) Inventors: Sean Allen Packer, Oak Park, CA (US); Alfred Abraham Brenner, Simi Valley, CA (US); Harold Brad Rinehart, Agoura Hills, CA (US)

(73) Assignee: Turf Group LLC, Agoura Hills, CA (US)

( * ) Notice: Subject to any disclaimer, the term of this patent is extended or adjusted under 35 U.S.C. 154(b) by 497 days.

(21) Appl. No.: 13/911,521

(22) Filed: Jun. 6, 2013

(65) Prior Publication Data

US 2014/0154432 A1 Jun. 5, 2014

Related U.S. Application Data

(63) Continuation-in-part of application No. 13/548,616, filed on Jul. 13, 2012.

(60) Provisional application No. 61/507,711, filed on Jul. 14, 2011, provisional application No. 61/657,436, filed on Jun. 8, 2012.

(51) Int. Cl.

| | |
|---|---|
| ***E01C 13/08*** | (2006.01) |
| ***B05D 5/00*** | (2006.01) |
| ***D06Q 1/12*** | (2006.01) |
| ***D06M 11/45*** | (2006.01) |

(Continued)

(52) U.S. Cl.
CPC ................ *E01C 13/08* (2013.01); *B05D 5/00* (2013.01); *D06M 11/45* (2013.01); *D06M 11/46* (2013.01); *D06M 11/83* (2013.01); *D06Q 1/12* (2013.01); *D06N 2205/10* (2013.01); *D06N 2205/106* (2013.01); *Y10T 428/23921* (2015.04); *Y10T 428/2991* (2015.01); *Y10T 428/2993* (2015.01); *Y10T 428/2998* (2015.01)

(58) Field of Classification Search
CPC .............. E01C 13/08; D06N 2205/10; D06N 2205/106; Y10T 428/2989; Y10T 428/2991; Y10T 428/2993; Y10T 428/2998
USPC ............................ 428/87, 402, 403, 407, 17
See application file for complete search history.

(56) References Cited

U.S. PATENT DOCUMENTS

| | | | |
|---|---|---|---|
| 3,740,303 | A | 6/1973 | Alderson et al. |
| 5,958,527 | A | 9/1999 | Prevost |

(Continued)

FOREIGN PATENT DOCUMENTS

| | | | | |
|---|---|---|---|---|
| JP | 53005233 | A | * | 1/1978 |
| JP | 2003171908 | A | * | 6/2003 |

(Continued)

OTHER PUBLICATIONS

PCT International Search Report and Opinion, Jan. 31, 2013.

(Continued)

*Primary Examiner* — Cheryl Juska
(74) *Attorney, Agent, or Firm* — Clifford H. Kraft

(57) ABSTRACT

An artificial turf surface comprised of natural looking fibrous materials can be infilled with small beads of black crumb rubber coated with heat reflecting material. These beads can also be engineered to have a variable spring force and can also be coated with titanium dioxide powder to have an anti-bacterial effect and laumontite to bind lead. Turf blades can also be coated to increase solar reflection.

6 Claims, 5 Drawing Sheets

(51) Int. Cl.
*D06M 11/46* (2006.01)
*D06M 11/83* (2006.01)

(56) References Cited

U.S. PATENT DOCUMENTS

| | | | | |
|---|---|---|---|---|
| 7,189,445 | B2 * | 3/2007 | Knox | E01C 13/08 428/17 |
| 7,758,281 | B2 * | 7/2010 | Knox | E01C 13/08 405/36 |
| 8,329,265 | B2 * | 12/2012 | Cook | E01C 13/08 428/17 |
| 8,795,834 | B2 * | 8/2014 | Tetrault | E01C 13/08 428/17 |
| 2003/0056432 | A1 | 3/2003 | Prevost | |
| 2004/0214000 | A1 | 10/2004 | Huff et al. | |
| 2005/0129906 | A1 * | 6/2005 | Knox | E01C 13/08 428/95 |
| 2005/0281963 | A1 * | 12/2005 | Cook | E01C 13/08 428/17 |
| 2007/0137017 | A1 * | 6/2007 | Knox | E01C 13/08 29/428 |
| 2007/0248772 | A1 * | 10/2007 | Cook | A41G 1/009 428/17 |
| 2010/0055461 | A1 * | 3/2010 | Daluise | E01C 13/08 428/403 |
| 2011/0081506 | A1 * | 4/2011 | Lee | C08L 23/12 428/17 |
| 2011/0091663 | A1 * | 4/2011 | Olde Weghuis | E01C 13/08 428/17 |
| 2011/0117297 | A1 | 5/2011 | Harmeling | |
| 2012/0258811 | A1 * | 10/2012 | Tetrault | E01C 13/08 472/92 |
| 2013/0199755 | A1 * | 8/2013 | Sawafta | E01C 13/08 165/104.11 |
| 2014/0193593 | A1 * | 7/2014 | Daluise | E01C 13/08 428/17 |
| 2014/0322459 | A1 * | 10/2014 | Tetrault | E01C 13/08 428/17 |

FOREIGN PATENT DOCUMENTS

| | | | | |
|---|---|---|---|---|
| JP | 2006-124984 | A | | 5/2006 |
| KR | 2011046778 | A | * | 5/2011 |

OTHER PUBLICATIONS

PCT International Search Report and Opinion Jan. 31, 2013.

* cited by examiner

SPECIAL COATINGS AND INFILL FOR ARTIFICIAL TURF

This is a continuation-in-part of application Ser. No. 13/548,616 filed Jul. 13, 2012 which relied on U.S. Provisional patent application 61/507,711 filed Jul. 14, 2011. This application also is related to, and claims priority to, U.S. Provisional application 61/657,436 filed Jun. 8, 2012. Application Ser. Nos. 13/548,616, 61/507,711 and 61/657,436 are hereby incorporated by reference in their entirety.

BACKGROUND

1. Field of the Invention

The present invention pertains generally to artificial turfs and in particular to artificial turf with coatings and infill materials with coatings that can give the turf solar reflectivity, an adjustable spring force and anti-microbial and heavy metal binding properties.

2. Description of the Prior Art

Artificial turfs or synthetic turfs are known typically as grass-like, man-made surfaces manufactured from synthetic materials. This turf can be used in homes, commercial and industrial properties, and resorts and also used in recreational areas and common areas for multiunit dwellings and also arenas for sports that were originally played on natural grass. The use of artificial turf is expanding rapidly. The first artificial turfs developed and installed were far harder than grass. Their use was limited due to a bad reputation, appearance, and claims that the hard surface caused injuries to participants in sports activities. Additionally, older turf surfaces were colored using lead based pigments, resulting in many fields now found to be contaminated with lead. This lead creates a health risk to athletes playing on these surfaces and has been found to leech into the environment via aqueous runoff, creating an even larger public health risk.

New artificial playing surfaces using sand and/or rubber infill have more recently been developed. These artificial grass surfaces are often virtually indistinguishable from grass when viewed from any distance, and are generally regarded as being about as safe to play on as a typical grass surface.

Many sports clubs have decided to install synthetic turf surfaces due to their lower maintenance costs and improved play in colder conditions. However, it is the warmer conditions that are causing most concern for players.

Most common types of artificial turf uses polyethylene “grass” 2 to 8 centimeters long, which is lubricated and tufted into a woven backing fabric the rear of which is coated with a polyurethane or latex backing medium to lock the tufts in to place. This mat of turf can be filled to the client’s specification with sand and rubber granules which keeps the fibers upright and provides the right level of shock absorbency. The majority of the turf manufacturers approved by various sports associations use this technology. In some applications of the turf, it is also interspersed with short, curly, spring-like fibers that keep the blades upright. Sometimes a rubber layer can also be added.

Although artificial turfs are mostly applied in sporting venues, the term “artificial turf” encompasses any applications or modifications that lead to synthetic grass, i.e. grass that is made of a synthetic material (usually a polymer such as polyethylene or polypropylene). Such applications also include but are not limited to landscape applications and to green roofs on buildings.

The components used for artificial turf surfaces include—as mentioned above—fibers, filaments and tapes, and if applicable infill materials.

While already having advantages over natural grass surfaces in cold areas or in the wintertime, the overall comfort of artificial turfs in hotter climates or seasons is still a problem.

U.S. Pat. No. 3,740,303 discloses an artificial playing surface that comprises a pile fabric with pile fibers having pigments and materials to stabilize against UV light. These stabilizers usually are sterically hindered amines that catch the radicals generated by the energy of the UV light.

US 2004/0214000 is directed to aggregate turf filler for use with the turf of athletic fields and landscape area, which comprise crushed silica sand particles. Such fillers may be colored to enhance the appearance of the surface.

U.S. Pat. No. 5,958,527 discloses a synthetic grass turf with a unique multiple course resilient particulate infill. The infill consists of brightly colored sand and may serve the purpose to reduce the heat retention of the infill.

US 2003/0056432 discloses a synthetic grass surface with widely spaced rows of ribbons projecting from a flexible backing sheet which grass surface comprises thermal regulation means attached to the backing sheet in the spaces.

DESCRIPTION OF THE FIGURES

Attention is now directed to several drawings that illustrate features of the present invention.

Several illustrations and drawings have been presented to aid in understanding the present invention. The scope of the present invention is not limited to what is shown in the figures.

DESCRIPTION OF THE INVENTION

The present invention relates to an artificial turf that offers comfort and safety both under hot and cold conditions, and coatings and/or infill which can easily and reliably be added during the manufacturing process or any time thereafter. The coating process and/or infill process can take place either before or after the blades are attached to the backing material. Of course, once installed in the field the coating and/or infill process must take place with blades already attached to the backing material. After the backing material and ribbons are combined to make the turf that is the finished product ready to be shipped to customers, the customer then has the option of ordering the turf with or without the IR reflective coating.

The present invention relates to coatings and especially infill bead material with coatings that reduces thermal absorption (which causes the turf to get hot in the sun), has controllable compressive force characteristics, can be made anti-microbial, and can be made to bind and sequester heavy metal contaminants to remediate lead affected fields.

Figure 1:
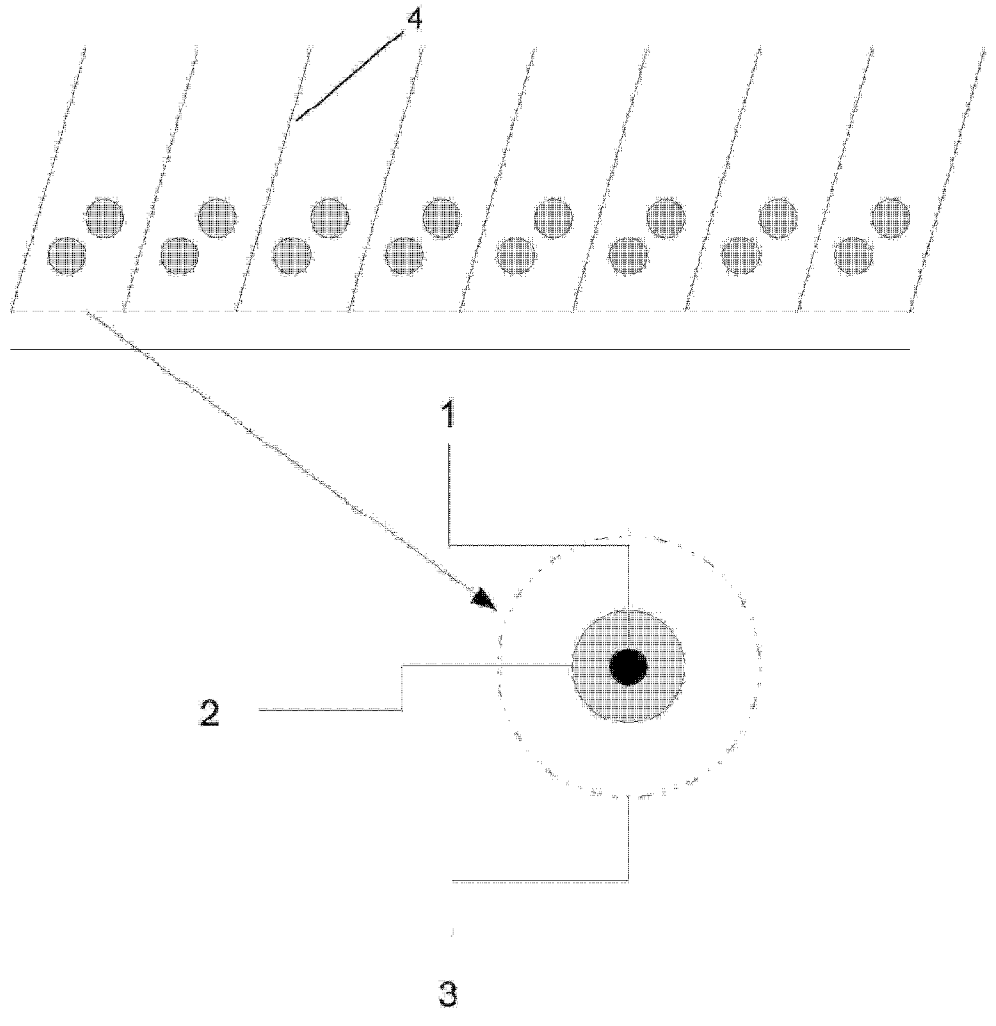
FIG. 1 is a cross-sectional schematic diagram of artificial turf with infill.

FIG. 1 shows a schematic diagram of synthetic turf with infill. Infill beads 4 are typically made from balls of crumb rubber 1 that are coated with paint 2 that can contain reflective metals, and Diatomaceous Earth to control spring force, and finally with zeolyte 3 (also spelled zeolite) that can contain titanium dioxide and other additives. The paint bound mineral encrusted particle results in higher solar reflectivity. The titanium dioxide can result in anti-microbial activity.

Solar Absorption

Figure 2:
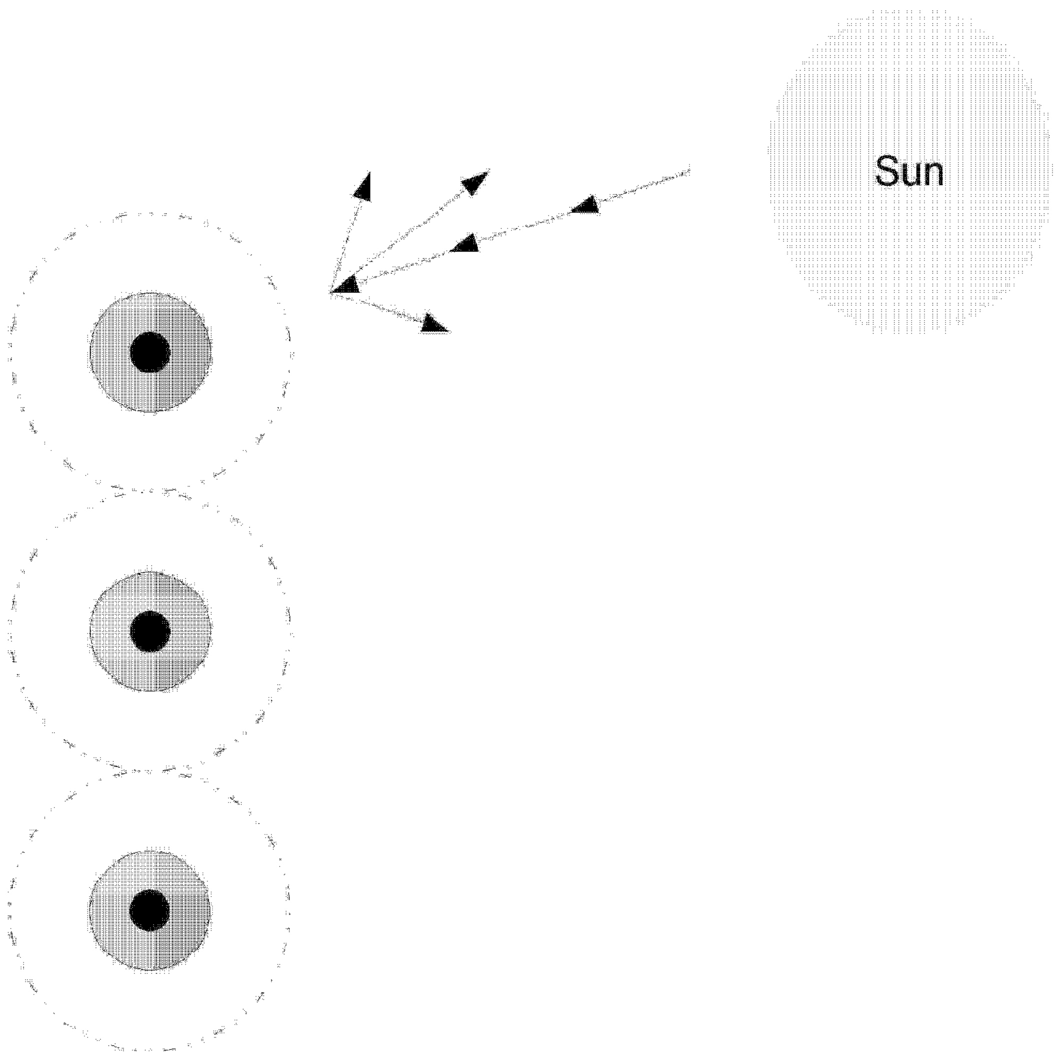
FIG. 2 is a schematic diagram of solar reflectivity from infill.

In an outdoor setting, solar radiation, of which IR is the major heat generating absorptive species, is captured by the carbon-carbon and carbon-hydrogen bonds of the black rubber crumb infill or the polypropylene or polyethylene of the artificial turf and converted into translational, rotational, and vibrational energy resulting in a rise in temperature of the turf and the infill. Light energy not captured by the material, or, redirected away from a material by inherent chemical or optical nature of the surface, or, captured at the atomic level but not converted into translational, rotational and vibrational energy does not cause the temperature of the material to rise. These properties include, but are not limited to, reflection, refraction, Rayleigh scattering, Stokes Raman scattering, Anti-Stokes Raman scattering, fluorescence, phosphorescence, transmittance, opacity and thermal insulation. FIG. 2 shows solar reflection schematically.

The term IR means infra-red and is used to mean a range of wavelengths of the total solar reflectance which is in the infra-red range, typically longer than 700 nm in wavelength. Reflectance of IR light prevents the turf from heating in sunlight. The higher the solar reflectance, the cooler the object will be. Particularly preferred is the reflectance of the heat radiation in the infrared spectrum since IR makes up over 50% of the solar spectrum, and is thus a significant portion of the sun's heat energy. Reflectance is appreciable in the wavelength range of light from approximately 700 nm to approximately 1 um or longer. For this reason additives and pigments are used with an increased reflectance in the so-called near infrared (NIR) range, i.e., in the wavelength range from about 700 nm to about 1 micron or longer. The light reflectance should be at least as high as that of a natural grass turf surface. It is preferred for it to be 10% or even 20% higher than that of a natural grass turf surface.

The objective of keeping the temperature of the turf down is achieved for the turf itself by an artificial turf coating that includes a polyurethane base containing nano zinc oxide and phenol like compounds including but not limited to Vanillin, Cinnamic acid, para amino benzoic acid, octisalate and salicylic acid that were found to exhibit solar reflective properties, wherein the surface of the blades of the artificial turf is coated by methods, including a spraying process, an immersion process and a roller coating process. For the infill, the black crumb rubber beads can be coated with Titanium dioxide (Reflection of IR), mixed metal oxides (Reflection of IR and coloring agent), and Diatomaceous earth (Reflection of IR, heat insulator and stiffening agent) in a latex base. The surface of the beads can also be coated with laumontite (IR reflection and refraction and anti-caking agent with cation exchange properties) and Titanium dioxide powder to enhance anti-microbial action.

In contrast to the prior art, the present invention restricts the presence of the additives and pigments to be incorporated into a coating to a preferred location at the surface of the fibrous material or the surface of the rubber beads. The present invention also uses, as infill, pre-coated IR reflective mini-beads that migrate to the base of the blades and reflect unwanted IR radiation that penetrates the upper levels of the blades. The IR reflective coating leaves the other properties of the fibrous material substantially unchanged, which is important for the suitability of the artificial turf for such uses as ball rolling and running and the like. The goal of the coating process is to have the IR reflecting material adhere to the surface of the blades, while at the same time maintaining the same feel and characteristics of real, natural blades of grass in natural turf, especially as the surface might effect the true roll of a golf or soccer ball.

Blade Study:

Polyethylene Synthetic turf surface was not coated (Control), or spray coated with polyurethane (polyurethane), or spray coated with 1% Octisalate (WN), 1% Vanillin (WN), 1% Willow Bark extract (WN), 1% Nano Zinc oxide and 1% synthetic Vanilla extract (VN) in a polyurethane base (Polyurethane+additives) at an application rate of approximately 1-2 mis liquid/sq. foot. Treated samples and controls were tested for their ability to gain temperature with exposure to high intensity light. Surface temperatures were obtained in thirty second intervals using an infrared thermometer after exposure to light generated from a halogen based bulb set at 22 inches from the surface. Temperatures were measured at the centers in triplicate using a digital infrared thermometer, and averages are reported. After a 3 min exposure, treated turf exhibits about a 9% decrease in temperature gain as compared to untreated or polyurethane treated controls.

Infill Indoor Halogen Light Study

Black crumb rubber infill, Diatomaceous Earth, and Green Diatomaceous Earth or Tan Laumontite encrusted/painted crumb rubber infills were tested for their ability to gain temperature with exposure to high intensity light. Surface temperatures were obtained in thirty second intervals using an infrared thermometer after exposure to light generated from a halogen based bulb set at 22 inches from the surface of 50 gram samples in a 2.5 in diameter circular container. Temperatures were measured at the centers in triplicate using a digital infrared thermometer, and averages are reported. Black crumb rubber generated the greatest increase in temperature measuring 195° F. over a 300 sec exposure, or 100° F. above Diatomaceous Earth for the exposure. Tan Laumontite encrusted rubber had the lowest increase in temperature for the encrusted infills reaching 140° F. (55° F. cooler than Black crumb rubber), while Diatomaceous Earth had the lowest overall increase in temperature reaching 95° F. over the same time interval. Green Diatomaceous Earth encrusted rubber, reaching 152° F. in 300 sec. was intermediate in temperature cooling (43° F. cooler than Black crumb rubber).

Infill Outdoor Study 1:

Synthetic Polyethylene turf, "Carmel" with an 82 oz. Face weight was infilled with 1.5 lbs. Tan Laumontite encrusted infill per square foot (Carmel 82 Tan), or left unfilled, and exposed to midday sunlight for 30 minutes. Surface temperatures were obtained in five minute intervals using an infrared thermometer. A 30° F. maximum decrease in temperature gain was observed for infilled turf.

Infill Outdoor Study 2:

Synthetic Polyethylene turf, "Sherwood" with an 65 oz. Face weight was infilled with 1.25 lbs Green Diatomaceous Earth encrusted infill per square foot (Sherwood 65 Pine), or left unfilled, and exposed to midday sunlight for 30 minutes. Surface temperatures were obtained in five minute intervals using an infrared thermometer. A 20° F. maximum decrease in temperature gain was observed for infilled turf.

Infill Study 3:

Synthetic Polyethylene turf, "Monterey" with an 82 oz. Face weight was infilled with 1.5 lbs Green Diatomaceous Earth+Tan Laumontite encrusted infill per square foot (Monterey 82 Confetti), or left unfilled, and exposed to midday sunlight for 30 minutes. Surface temperatures were obtained in five minute intervals using an infrared thermometer and results are charted below. A 29° F. maximum decrease in temperature gain was observed for infilled turf.

Spring Force

Figure 3:
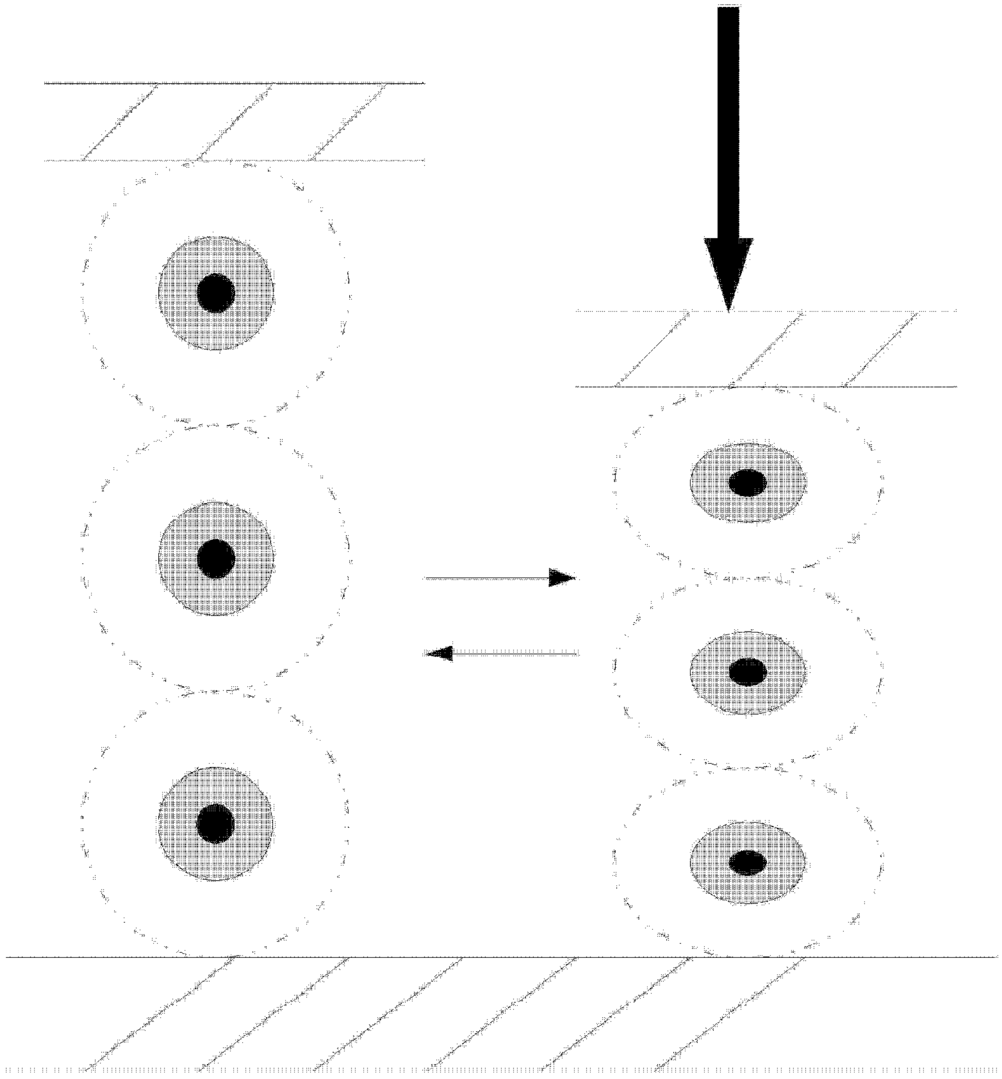
FIG. 3 is a schematic diagram of the spring force effect of external compressive force on infill.

The response to compressional force is extremely important for an artificial turf. FIG. 3 shows a schematic diagram of the response of infill particles to compressional force. It is possible to quantify the spring force by stating the force required to produce a predetermined linear compression. The following was the experimentally determined pressure required to produce a 0.2 inch compression for various materials used to produce infill:

1) Black Crumb Rubber (BCR)=4.71 lb/sq in. BCR over sand=5.0 lb/sq in.

(Black Crumb Rubber is weakest spring force, stiffens a little when mixed with sand).

2) BCR coated two times with Diatomaceous Earth (DE)=8.3 lb/sq in. BCR coated two times with (DE) over sand=11.4 lb/sq in.

(Diatomaceous Earth coated BCR is a moderate spring and stiffens over sand).

3) BCR coated three times with Zeolyte=13.1 lb/sq in. BCR coated three times with Zeolyte over BCR=7.1 lb/sq in.

(Zeolyte BCR has stiffest spring force, but is weaker if placed over BCR).

The spring force testing was performed as follows:

3.75 (L) in.×1.75 (D) in.×2.25 (H) in. metal boxes were lined with 3.75 in. (L)×1.175 in. (W)×1.25 in. (H) Athletic turf and infilled to the top of the turf. The infilled turf was topped with a 3.7 in.×1.5 in (5.5 sq. in.) wood block and pressurized 3 times up to 100 lbs. Peak force is determined at 0.2 in loading from 0 force position. The average of three experiments are shown above.

An important feature of the present invention is that the spring force can be modified in the field by vacuuming up and replacing beads at any time during the life of the playing field. It is thus possible to maintain and/or change a certain spring force for season or sport for any playing field. Prior art products such as silicates and plastics have no spring action; rubber has a weak spring action; foam rubber compacts to no spring action; the present invention has a custom spring action depending on which mineral, how many coatings, and what concentration of mineral is used in the paint.

Anti-Microbial Action

Figure 4:
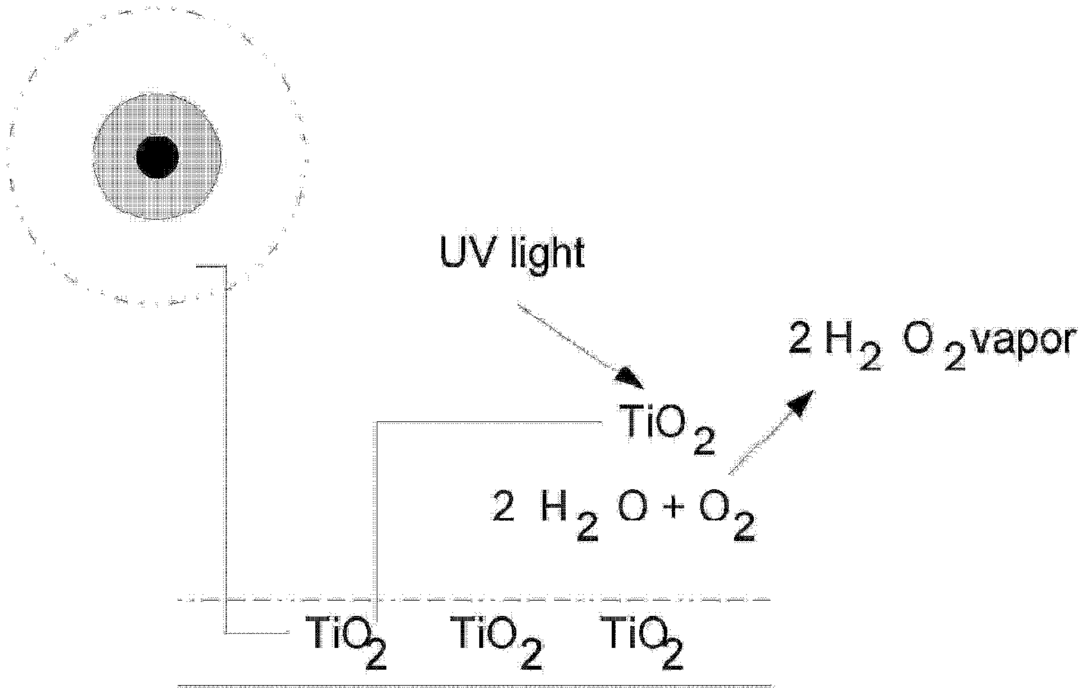
FIG. 4 shows the use of titanium dioxide on infill to generate anti-microbial hydrogen peroxide vapor in the presence of sunlight, gaseous water and oxygen.
Figure 5:
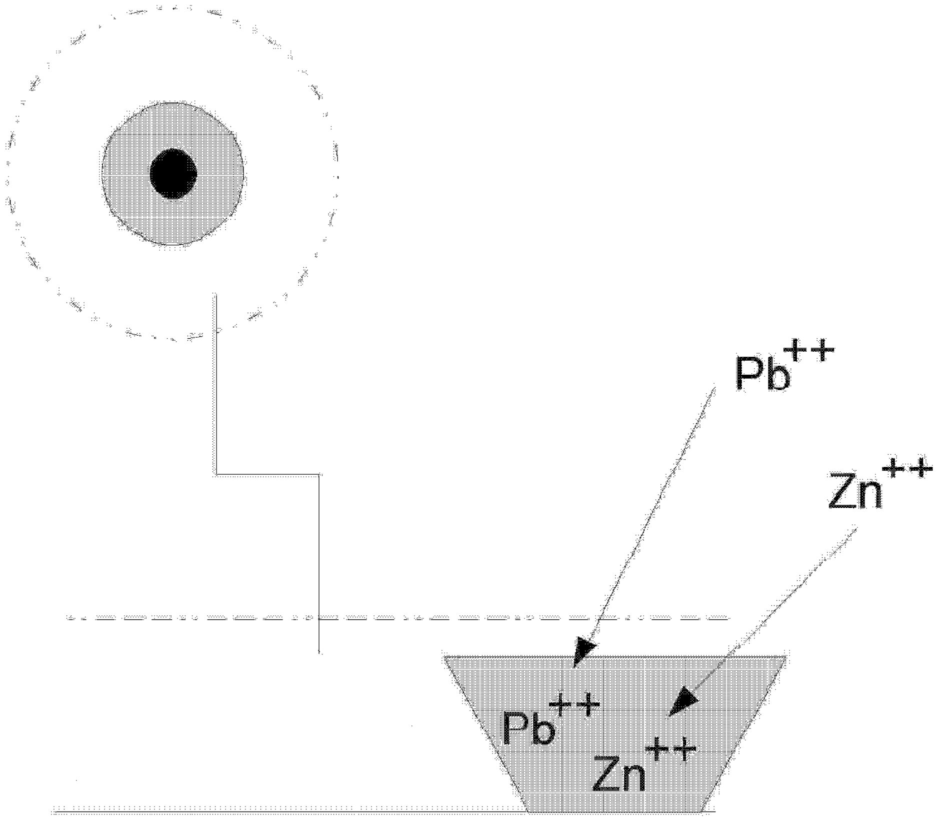
FIG. 5 shows the binding ability of heavy metals to the Laumontite surface of infill.

By using infill coatings containing Titanium Dioxide ($TiO_2$), anti-microbial action can be caused to take place. FIG. 4 shows a schematic diagram of infill material coated with $TiO_2$. Slightly moist $TiO_2$ exposed to ultraviolet light acts as a catalyst to convert some water molecules to hydrogen peroxide ($H_2O_2$) as shown in FIG. 4. The resulting hydrogen peroxide solution has an antiseptic effect. This can be very useful for keeping the turf free from bacteria. It also helps to keep mold and fungus from forming on the turf.

Heavy-Metal Binding

Heavy metals such as Zinc or Lead can bind in a Laumontite coating on infill material. Hence, another important feature of the invention is that when laumontite is used to coat the beads, approximately 90 mg of lead can be bound per pound of infill. This allows the infill to be used in remediation and for containment of lead contaminated fields.

Several descriptions and illustrations have been presented to aid in understanding the present invention. One with skill in the art will understand that numerous changes and variations can be made without departing from the spirit of the invention. Each of these changes and variations is within the scope of the present invention.

We claim:

1. A solar reflecting artificial turf comprising: artificial turf material with infill material, said infill material comprising beads made of coated black crumb rubber (BCR), said BCR being coated with a solar reflective material and diatomaceous earth as a spring force control material, and wherein said coated beads are also coated with an anti-microbial material.

2. The solar reflecting artificial turf of claim 1 wherein said solar reflective materials are titanium dioxide and zeolyte.

3. The solar reflecting artificial turf of claim 1 wherein said solar reflective material is a mixed metal oxide.

4. The solar reflecting artificial turf of claim 1 wherein said anti-microbial material is titanium dioxide.

5. The solar reflecting artificial turf of claim 1 wherein the beads are also coated with laumontite.

6. The solar reflecting artificial turf of claim 1 wherein the coating with the solar reflective material includes a polyurethane base containing nano zinc oxide and at least one of vanillin, cinnamic acid, para amino benzoic acid, octisalate, or salicylic acid.

* * * * *